No. 781,508. PATENTED JAN. 31, 1905.
B. E. FERNOW.
MACHINE FOR CUTTING OUT SIDE SEAMS OF OLD METAL CANS.
APPLICATION FILED AUG. 4, 1903.

Witnesses:
R A Balderson
J. B. Hill

Inventor:
Bernhard E. Fernow,
by Byrnes & Townsend
Att'ys.

No. 781,508. Patented January 31, 1905.

UNITED STATES PATENT OFFICE.

BERNHARD E. FERNOW, OF ITHACA, NEW YORK.

MACHINE FOR CUTTING OUT SIDE SEAMS OF OLD METAL CANS.

SPECIFICATION forming part of Letters Patent No. 781,508, dated January 31, 1905.

Application filed August 4, 1903. Serial No. 168,162.

*To all whom it may concern:*

Be it known that I, BERNHARD E. FERNOW, a citizen of the United States, residing at Ithaca, in the county of Tompkins and State of New York, have invented certain new and useful Improvements in Machines for Cutting Out the Side Seams of Old Metal Cans, of which the following is a specification.

This machine is designed to shear out the side seam or a similar strip from the body of old sheet-metal cans, thereby providing an opening for the insertion of cutters to remove the heads and enable the body of the can to be recovered in the form of a squared sheet. The machine comprises a base for supporting the can, a standard carrying parallel stationary cutters, and a vertically-reciprocating cutting-tool having a beveled point and cutting edges which coöperate with the edges of the fixed cutters to shear the metal body.

Figure 1:
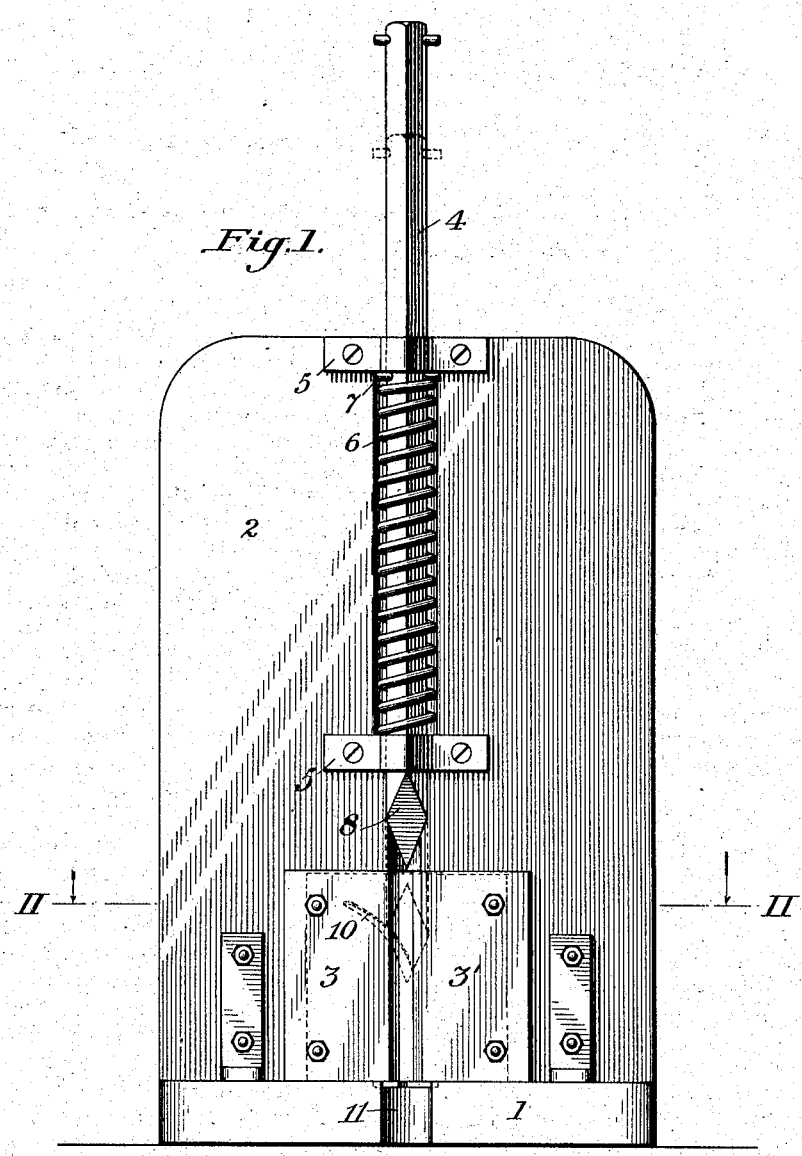
Figure 2:
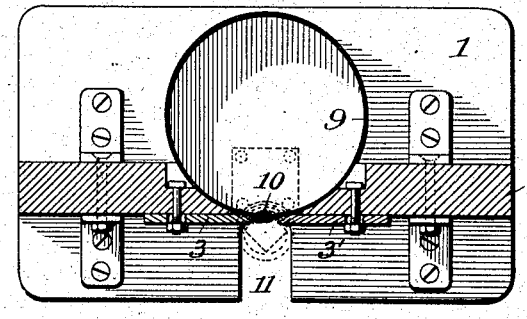

Referring to the accompanying drawings, Figure 1 is a front elevation of the machine, and Fig. 2 is a horizontal section on the line II II of Fig. 1.

The machine comprises a base 1, to which is secured a transverse vertical standard 2. The base and standard may be of wood. Steel cutters 3 3' with adjacent beveled cutting edges are adjustably bolted to one face of the standard. The cutting-tool 4, a square steel rod, is arranged to reciprocate in a vertical angular groove in one side of the standard and in alinement with the space between the fixed cutters, being retained in place by the guides 5. A spiral spring 6 surrounds that portion of the tool between the guides 5, bearing at its lower end against the lower guide and at its upper end against a pin 7, extending transversely through the tool. The lower end of the tool 8 is beveled rearwardly to a point, thus providing a knife or cutter having three triangular faces. This knife may be a removable piece to facilitate sharpening. The two rear faces of the knife slide along the beveled shear edges of the cutters 3 3', while the point of the knife normally stands above and slightly inside the can-body, as shown by dotted lines in Fig. 2. The standard 2 is vertically slotted and recessed behind the cutters 3 3' to receive the can 9, which is usually so placed that its side seam 10 lies between the fixed cutters. By forcing down the cutting-tool the cutting edges at the sides of the beveled face 8, coöperating with the beveled edges of the cutters 3 3', shear out the seam or similar portion 10 of the body of the can, the knife being received in a recess 11 in the base of the machine when the cutting-tool is fully depressed. The pointed end of the knife and its beveled face 8 hold the can closely against the fixed cutters as the tool descends. The longitudinal opening left by the removal of the side seam or a similar strip serves for the insertion of cutters by which the heads are subsequently removed, the body of the can being thus recovered for further use. The machine preferably employed to cut off the heads is shown and claimed in my application, Serial No. 226,700, filed September 30, 1904.

I claim—

1. A machine for cutting out the side seam of sheet-metal cans, comprising a pair of cutters having cutting edges arranged to bear against the can-body at each side of the seam, and a tool having knife-edges in position to coöperate with said cutters and shear out the seam, said tool being reciprocable relatively to said cutters, as set forth.

2. A machine for cutting out the side seam of sheet-metal cans, comprising a pair of cutters having cutting edges arranged to bear against the can-body at each side of the seam, and a tool having a beveled point with lateral knife-edges in position to coöperate with said cutters and shear out the seam, said tool being reciprocable relatively to said cutters, as set forth.

3. A machine for cutting out the side seam of sheet-metal cans, comprising a pair of cutters having cutting edges arranged to bear against the can-body at each side of the seam, and a tool having a beveled point with triangular faces and lateral knife-edges in position to coöperate with said cutters and shear out the seam, said tool being reciprocable relatively to said cutters, as set forth.

4. A machine for cutting out the side seam of sheet-metal cans, comprising a base to support the can, a standard carrying a pair of cutters with cutting edges arranged to bear against the can-body at each side of the seam, said standard slotted to receive the seam between the cutters, and a tool arranged to reciprocate on said standard, said tool having knife-edges in position to coöperate with said cutters and shear out the seam, as set forth.

5. A machine for cutting out the side seam of sheet-metal cans, comprising a base to support the can, a standard carrying a pair of cutters with cutting edges arranged to bear against the can-body at each side of the seam, said standard slotted to receive the seam between the cutters, and a tool arranged to reciprocate on said standard, said tool having a beveled point with lateral knife-edges in position to coöperate with said cutters and shear out the seam, as set forth.

6. A machine for cutting out the side seam of sheet-metal cans, comprising a base to support the can, a standard carrying a pair of cutters with cutting edges arranged to bear against the can-body at each side of the seam, said standard slotted to receive the seam between the cutters, and a tool arranged to reciprocate on said standard, said tool having a beveled point with triangular faces and lateral knife-edges in position to coöperate with said cutters and shear out the seam, as set forth.

In testimony whereof I affix my signature in presence of two witnesses.

BERNHARD E. FERNOW.

Witnesses:
CHARLES G. SIGNOR,
O. GERTRUDE HAST.